US008638394B2

(12) United States Patent
Onodera

(10) Patent No.: US 8,638,394 B2
(45) Date of Patent: Jan. 28, 2014

(54) ELECTRONIC APPARATUS, ELECTRONIC APPARATUS CONTROL DEVICE AND ELECTRONIC APPARATUS CONTROL METHOD

(75) Inventor: Yu Onodera, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/417,965

(22) Filed: Mar. 12, 2012

(65) Prior Publication Data

US 2012/0314132 A1    Dec. 13, 2012

(30) Foreign Application Priority Data

Jun. 10, 2011  (JP) .................................. 2011-130295

(51) Int. Cl.
*H04N 5/50*    (2006.01)
(52) U.S. Cl.
USPC ............ 348/569; 348/738; 348/730; 381/109
(58) Field of Classification Search
USPC ................. 348/563, 569, 552, 730, 738, 632; 381/105, 104, 109
See application file for complete search history.

(56) References Cited

U.S. PATENT DOCUMENTS

2008/0022314 A1*  1/2008  Moon ............................ 725/62
2009/0262955 A1  10/2009  Kimura

FOREIGN PATENT DOCUMENTS

JP    2003-087142    3/2003
JP    2007-081617    3/2007
WO   2008/015864 A1  2/2008

* cited by examiner

*Primary Examiner* — Michael Lee
(74) *Attorney, Agent, or Firm* — Blakely, Sokoloff, Taylor & Zafman LLP

(57) ABSTRACT

According to one embodiment, an electronic apparatus includes an information display module, a change instruction receiver, and an information display controller. The information display module is configured to display output information at start-up time of the electronic apparatus. The change instruction receiver is configured to receive an instruction to change the displayed output information. The information display controller is configured to control the information display module to change display of the output information in accordance with the change instruction when the electronic apparatus in a standby state receives the change instruction.

14 Claims, 11 Drawing Sheets

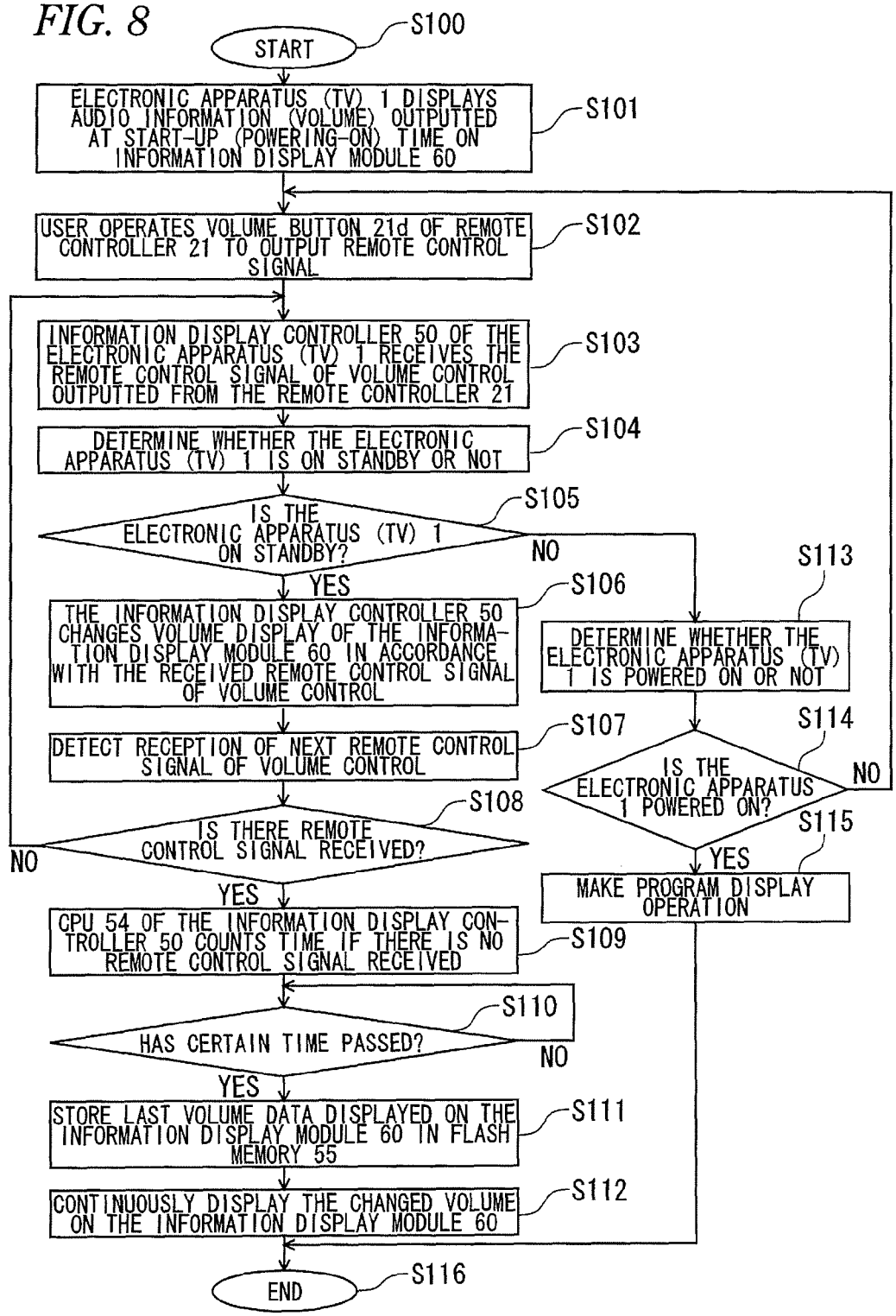

ial Patent Application No. 2011-130295 filed on Jun. 10, 2011, the entire contents of which are incorporated herein by reference.

ELECTRONIC APPARATUS, ELECTRONIC APPARATUS CONTROL DEVICE AND ELECTRONIC APPARATUS CONTROL METHOD

CROSS REFERENCE TO RELATED APPLICATION(S)

This application is based upon and claims the benefit of priority from Japanese Patent Application No. 2011-130295 filed on Jun. 10, 2011, the entire contents of which are incorporated herein by reference.

FIELD

Embodiments described herein relate generally to an electronic apparatus, an electronic apparatus control device and an electronic apparatus control method.

BACKGROUND

Electronic apparatuses such as televisions (TV), personal computers (PC), etc. have come into wide use recently.

These electronic apparatuses output video and audio when they are started up (powered ON).

For example, when a television (TV) is powered OFF, output information (last channel information) of a broadcast channel, volume, etc. outputted at that time is generally stored in a storage module such as a semiconductor memory.

When the television is then powered ON (started up), the television outputs the broadcast channel outputted at the powering-OFF time with the volume outputted at the powering-OFF time by using the information (last channel information) stored in the semiconductor memory or the like.

The volume may be too large when the electronic apparatus (a television etc.) is started up (powered ON) in an environment where it is desired to avoid large volume output in a relatively quiet time zone such as early morning or late night or at a quiet place such as a hospital.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

FIG. 8 is an exemplary flow chart for explaining operation of the information display controller of the electronic apparatus (a TV etc.) according to the exemplary embodiment;

DETAILED DESCRIPTION

In general, according to one embodiment, an electronic apparatus includes an information display module, a change instruction receiver, and an information display controller. The information display module is configured to display output information at start-up time of the electronic apparatus. The change instruction receiver is configured to receive an instruction to change the displayed output information. The information display controller is configured to control the information display module to change display of the output information in accordance with the change instruction when the electronic apparatus in a standby state receives the change instruction.

Exemplary embodiments will be described below with reference to the drawings.

Figure 1:
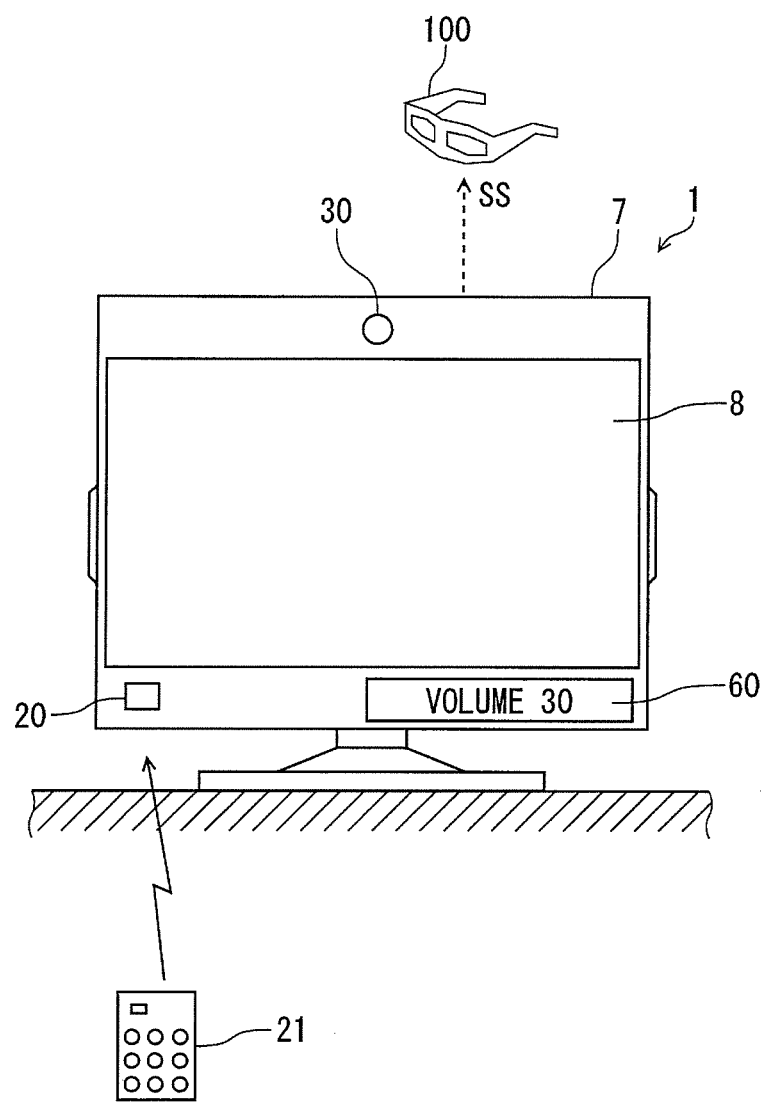
FIG. 1 is an exemplary external view showing an external appearance of an electronic apparatus (a TV etc.) according to an exemplary embodiment.

FIG. 1 is an external view showing the external appearance of an electronic apparatus (a TV etc.) according to an exemplary embodiment.

In this exemplary embodiment, for example, the electronic apparatus (TV) 1 is provided with an information display module 60 which displays output information such as volume information, channel information, etc. at the start-up time.

When the electronic apparatus (TV) 1 in a standby state receives an instruction to change display of the information display module 60, display of the output information is changed in accordance with the change instruction.

For example, the information display module 60 has an LED (Light Emitting Diode). It is known that the LED generates light by a physical reaction with little loss due to heat. Accordingly, the LED is suitable for this exemplary embodiment because power consumption of the LED is relatively low.

Incidentally, the LED may be replaced by a relatively low power consumption display device such as an organic light-emitting diode.

For example, the electronic apparatus (TV) 1 receives a remote control signal transmitted from a remote controller 21 operated by a user (viewer) by using a remote control signal receiver 20 and performs operation of video display, etc.

In this exemplary embodiment, the electronic apparatus (TV) 1 can display 3D video on a video display module (display screen) 8. For example, the 3D video is composed of video images captured at different angles from the left and right. The 3D video can be viewed by the user (viewer) wearing 3D glasses 100.

For example, the 3D glasses 100 include liquid crystal shutters and receive a sync signal (SS) outputted from the electronic apparatus (TV) 1. Shutter control of the 3D glasses 100 is performed based on the sync signal (SS).

In this exemplary embodiment, for example, the electronic apparatus (TV) 1 uses a camera 30 for detecting "human presence" as to whether there is presence of any person or not.

For example, the camera 30 used for detecting "human presence" is provided near the video display module 8 of the electronic apparatus (TV) 1. Alternatively, the camera 30 may be provided in the video display module 8.

When there is no "human presence" detected by this detecting module, for example, the electronic apparatus (TV) 1 turns OFF output of the sync signal (SS).

When the output of the sync signal (SS) is turned OFF, that is, when the 3D glasses 100 cannot receive the sync signal (SS), the 3D glasses 100 make control to power OFF the 3D glasses 100.

The electronic apparatus 1 according to this exemplary embodiment may be also applied to an electronic apparatus such as a personal computer, a portable terminal, etc.

Figure 2:
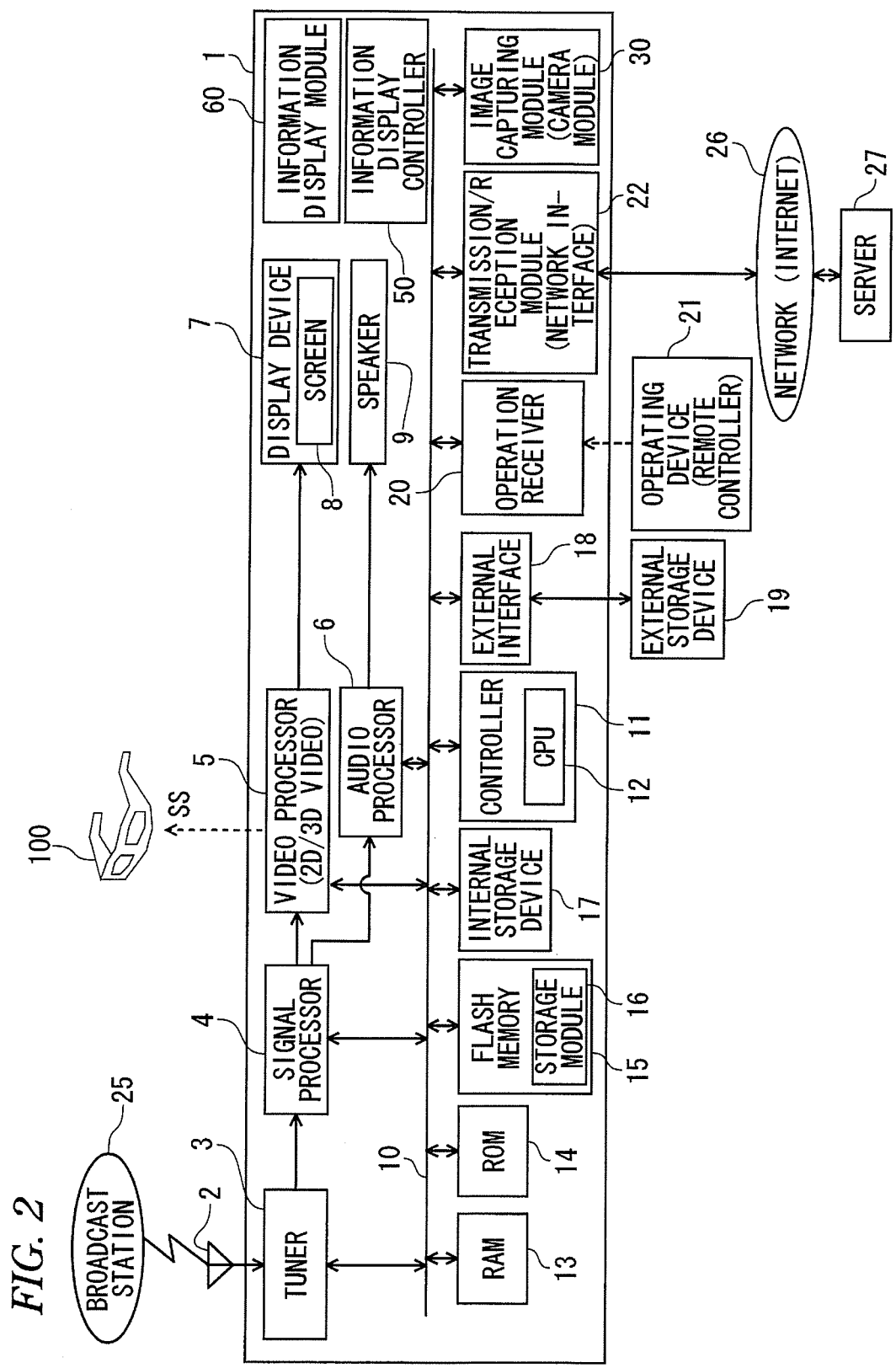
FIG. 2 is an exemplary block diagram showing the configuration of the electronic apparatus (a TV etc.) according to the exemplary embodiment.

FIG. 2 is a block diagram showing the configuration of the electronic apparatus (a TV etc.) according to the exemplary embodiment.

The reference numeral 2 represents an antenna; 3, a tuner; 4, a signal processor; 5, a video processor; 6, an audio processor; 7, a display device; 8, a display screen (video display module); 9, a speaker; 10, a bus; 11, a controller; 12, a CPU; 13, an RAM; 14, an ROM; 15, a flash memory; 16, a storage module; 17, an internal storage device; and 18, an external interface. The reference numeral 19 represents an external storage device connected to the external interface.

The reference numeral 20 represents an operation receiver; 21, a remote controller; 22, a transmission/reception module (network interface); 25, a broadcasting station; 26, a network (Internet); and 27, a server.

Here, the controller 11 is provided with the CPU 12 and controls the electronic apparatus (TV) 1. For example, the RAM 13, the ROM 14 and the flash memory 15 are used in processing executed by the controller 11.

For example, video contents are broadcasted in digital broadcasting from the broadcasting station 25. The digital broadcasting broadcasted from the broadcasting station 25 is received by the tuner 3 and subjected to channel selection processing, so that video contents of a digital signal are transmitted to the signal processor 4.

The video contents of the digital signal received by the signal processor 4 are subjected to signal processing, and transmitted to the audio processor 6 and the video processor 5.

The audio processor 6 receives the video contents subjected to signal processing, and transmits a signal subjected to audio processing to the speaker 9.

The speaker 9 receives the signal subjected to audio processing and outputs audio.

On the other hand, the video processor 5 receives the video contents subjected to signal processing, and transmits a signal subjected to video processing to the display device 7.

The display device 7 receives the signal subjected to video processing and displays video on the display screen (video display module) 8 constituted by an LCD panel, etc.

In this exemplary embodiment, the electronic apparatus (TV) 1 is provided with the internal storage device 17 in which the received video contents can be recorded.

In this exemplary embodiment, the electronic apparatus (TV) 1 is provided with the external storage device 19 USB-connected or LAN-connected as described above. The received video contents can be also recorded on the external storage device 19.

A user's operation for the electronic apparatus (TV) 1 is designated by an operating device such as the remote controller 21, etc.

These processings are controlled by the controller 11.

As described above, the electronic apparatus (TV) 1 is connected to the server 27 via the transmission/reception module (network interface) 22, so that, for example, a web page can be received and browsed.

In addition, in this exemplary embodiment, for example, the electronic apparatus (TV) 1 outputs a sync signal (SS) generated by the video processor 5. As described above, the sync signal (SS) is received by the 3D glasses 100 and used for the user (viewer) wearing the 3D glasses 100 to view 3D video.

Further, in this exemplary embodiment, the electronic apparatus (TV) 1 has the information display module 60, and an information display controller 50 which controls the information display module 60.

A remote control signal transmitted from the remote controller 21 operated by the user is, for example, received by the operation receiver 20 and transmitted to the information display controller 50 through the bus 10 to control the information display module 60.

A state (standby state) before starting-up of the electronic apparatus (TV) 1 in this exemplary embodiment will be described here.

For example, the electronic apparatus (a TV etc.) 1 is connected to a commercial power source (AC) and supplied with power from the commercial power source (AC) at start-up time (powering-ON time) so that the electronic apparatus (a TV etc.) 1 operates (though not shown).

In this exemplary embodiment, when an instruction to power OFF is given to the electronic apparatus (a TV etc.) 1, the electronic apparatus (a TV etc.) 1 is powered OFF while a part of the power supply to necessary circuits such as the operation receiver 20, etc. is left (standby) so that this instruction (e.g. a remote control signal) can be received.

That is, for example, the state where the electronic apparatus (TV) 1 is on standby so that the remote control signal can be received is a state (standby state) before starting-up of the electronic apparatus (TV) 1.

Figure 3:
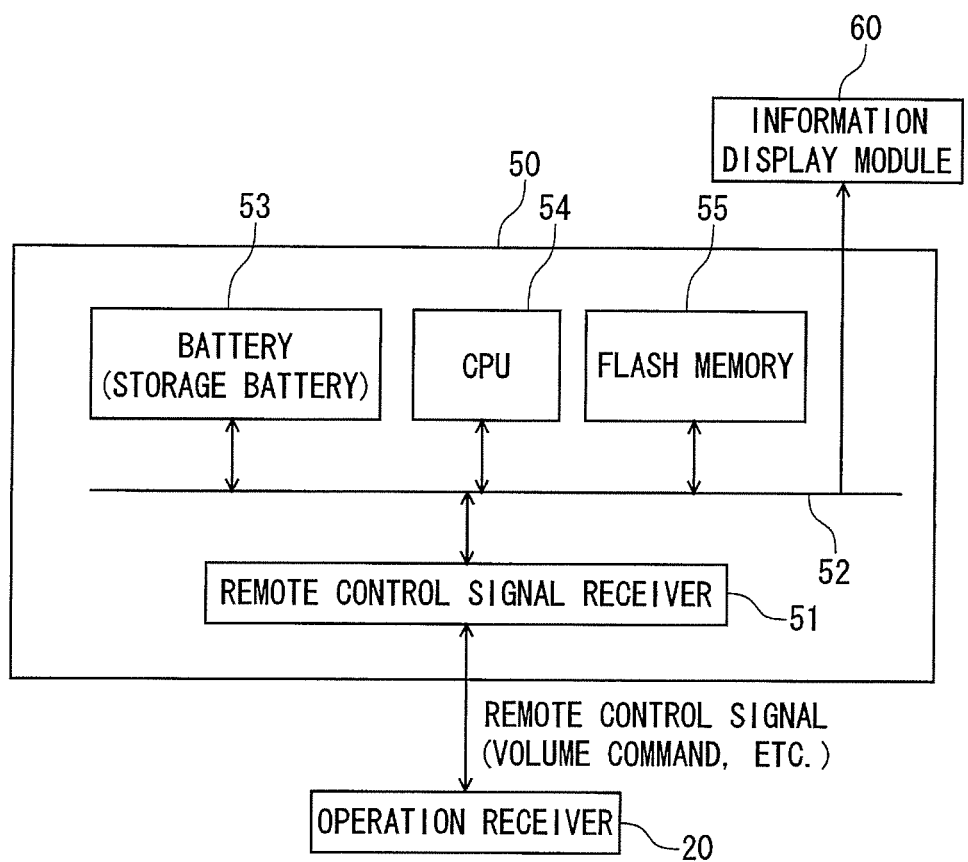
FIG. 3 is an exemplary block diagram showing the configuration of an information display controller formed in the electronic apparatus (a TV etc.) according to the exemplary embodiment.

FIG. 3 is a block diagram showing the configuration of the information display controller formed in the electronic apparatus (a TV etc.) according to the exemplary embodiment.

In this exemplary embodiment, the information display controller 50 has a remote control signal receiver 51, a bus 52, a rechargeable battery 53, a CPU 54, and a flash memory 55.

As shown in FIG. 3, the remote control signal receiver 51, the rechargeable battery 53, the CPU 54 and the flash memory 55 are connected to one another through the bus 52.

As described above, for example, the electronic apparatus (a TV etc.) 1 is supplied with power from the commercial power source (AC) so that the electronic apparatus (a TV etc.) 1 operates. The rechargeable battery 53 connected to the information display controller 50 can be charged suitably when connected to the commercial power source (AC).

The rechargeable battery 53 supplies power to the information display controller 50 and the information display module 60 even in the standby state. For this reason, the information display controller 50 and the information display module 60 can operate even in the standby state.

In this exemplary embodiment, for example, the information display controller 50 receives a remote control signal for designating a volume or channel operation transmitted from the remote controller 21, by using the remote control signal receiver 51.

The CPU 54 issues an instruction to control the information display module 60 in accordance with the received remote control signal.

That is, as described above, the information display controller 50 receives the remote control signal for designating a volume or channel operation transmitted from the remote controller 21 through the operation receiver 20, to thereby control the information display module 60.

In this exemplary embodiment, because the electronic apparatus (a TV etc.) 1 has the rechargeable battery 53, display on the information display module 60 can be continued, for example, even in the case where the electronic apparatus (a TV etc.) 1 is not supplied with power from the commercial power source (AC).

Figure 4A:
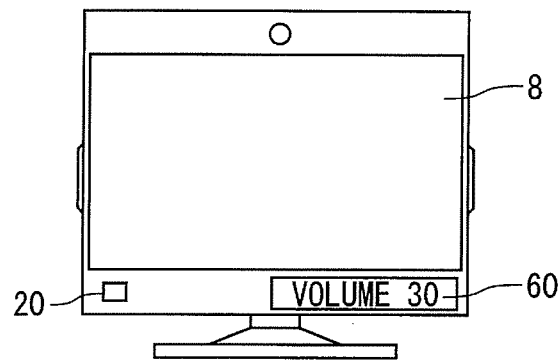
FIGS. 4A to 4C are exemplary views for explaining operation of the electronic apparatus (a TV etc.) 1 according to the exemplary embodiment.
Figure 4B:
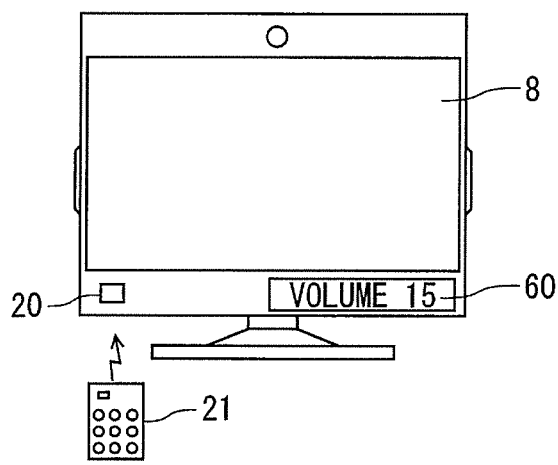
Figure 4C:
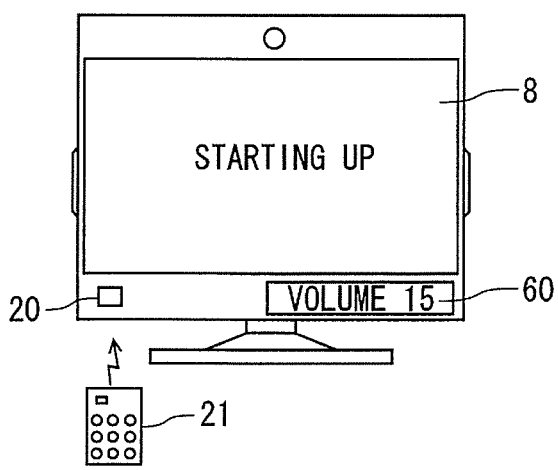

FIGS. 4A to 4C are views for explaining operation of the electronic apparatus (a TV etc.) 1 according to the exemplary embodiment.

As described above, in this exemplary embodiment, for example, the electronic apparatus (TV) 1 has the information display module 60 in addition to the video display module 8.

For example, output information such as volume information, channel information, etc. at start-up (powering-ON) time of the electronic apparatus (TV) 1 is displayed on the information display module 60.

FIG. 4A shows a state before starting-up of the electronic apparatus (TV) 1, that is, a standby state.

Here, output information (volume information) at start-up (powering-ON) time of the electronic apparatus (TV) 1 is displayed on the information display module 60. As shown in FIG. 4A, for example, it is illustrated that the user's previous operation was terminated at "volume 30". For example, the information about "volume 30" is stored in the flash memory 55 (FIG. 3) of the information display controller 50 (last channel).

FIG. 4B shows a state where, for example, the electronic apparatus (TV) 1 (in a standby state) before starting-up receives a remote control signal, for example, outputted from the remote controller 21 and indicating reduction of volume as described above and changes output information displayed on the information display module 60. Here, volume display is changed from the aforementioned "volume 30" to "volume 15". The information changed to "volume 15" is also stored, for example, in the flash memory 55 of the information display controller 50.

Here, when the electronic apparatus (TV) 1 in a standby state receives an instruction to change display on the information display module 60, indication of the output information is changed in accordance with the change instruction and displayed.

FIG. 4C shows a state where, for example, the user operates a power button 21a of the remote controller 21 while confirming the information of "volume 15" displayed on the information display module 60 to thereby issue an instruction (transmit a remote control signal) to start up the electronic apparatus (TV) 1 based on the displayed information "volume 15".

In this exemplary embodiment, as described above, the electronic apparatus (TV) 1 includes the information display controller 50 (FIG. 3).

When, for example, the electronic apparatus (TV) 1 receives an instruction (remote control signal) to start up the electronic apparatus (TV) 1, the electronic apparatus (TV) 1 is started up in accordance with the instruction. Here, information stored in the flash memory 55 of the information display controller 50 is acquired in accordance with the instruction (remote control signal) to start up the electronic apparatus (TV) 1.

Here, as described above, the info illation displayed on the information display module (LED) 60, that is, the information changed to "volume 15" is extracted from the flash memory 55 and acquired, for example, by the CPU 12 of the controller 11 of the electronic apparatus (TV) 1.

The CPU 12 instructs the speaker 9 to output audio at "volume 15", so that audio at "volume 15" is outputted from the speaker 9 in cooperation with starting-up of the electronic apparatus (TV) 1.

In this manner, for example, the electronic apparatus (TV) 1 can control output information (e.g. volume of audio outputted from the electronic apparatus (TV) 1) before the electronic apparatus (TV) 1 is started up.

Figure 5:
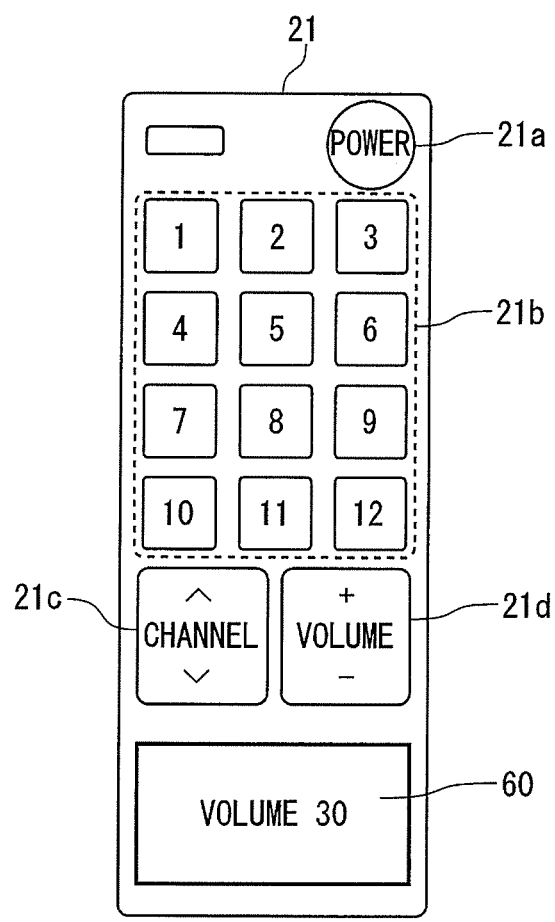
FIG. 5 is an exemplary external view showing the external appearance of a remote controller which transmits a remote control signal to an electronic apparatus (a TV etc.) according to another exemplary embodiment.

FIG. 5 is an external view showing the external appearance of a remote controller which transmits a remote control signal to an electronic apparatus (a TV etc.) according to another exemplary embodiment.

For example, the remote controller 21 has a power button 21a, numeric keys 21b such as "1", "2", "3", "4", etc., a channel key 21c used for moving up/down the broadcast channel number, and a volume key 21d used for increasing/decreasing volume.

Here, as shown in FIG. 5, the remote controller 21 is provided with an information display module 60 which has the same configuration as that of the electronic apparatus (TV) 1.

Though not shown particularly, the same configuration as the information display controller 50, for example, described above with reference to FIG. 3 is provided in the inside of the remote controller 21.

Incidentally, in the case of the remote controller 21, power for charging a battery (storage battery) 53 can be, for example, supplied by using a battery charger (not shown) in the same manner as in a portable electronic apparatus such as a cellular phone.

Figure 6A:
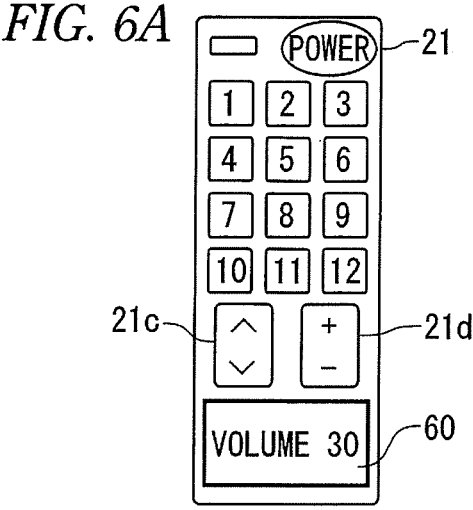
FIGS. 6A to 6C are exemplary views for explaining operation of a remote controller and the TV using the remote controller according to the other exemplary embodiment.
Figure 6B:
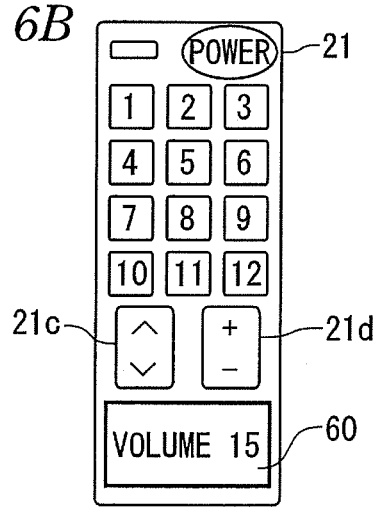
Figure 6C:
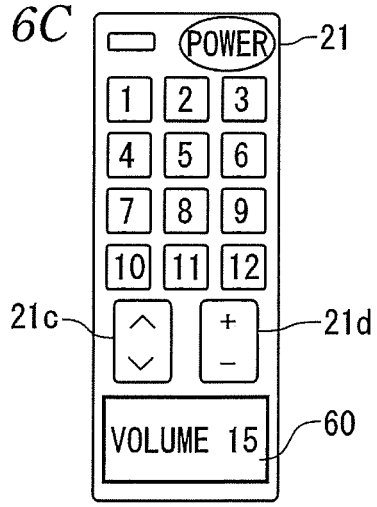

FIGS. 6A to 6C are views for explaining operation of the remote controller and the TV using the remote controller according to the other exemplary embodiment.

FIG. 6A shows a state of the remote controller 21 when the electronic apparatus (TV) 1 is in a (standby) state before starting-up.

Here, output information (volume information) at start-up (powering-ON) time of the electronic apparatus (TV) 1 controlled by the remote controller 21 is displayed on the information display module 60 of the remote controller 21.

Here, as shown in FIG. 6A, for example, it is illustrated that the user's previous operation (e.g. last channel) was terminated at "volume 30". For example, the information about "volume 30" is stored in the flash memory 55 of the information display controller 50 formed in the remote controller 21.

FIG. 6B shows a state where the user operates the remote controller 21 to change output information (audio display) when the electronic apparatus (TV) 1 is in a state before start-up (a standby state).

Here, volume display on the information display module 60 is changed from "volume 30" shown in FIG. 6A to "volume 15".

The change of output information (audio display) to "volume 15" is also stored in the flash memory 55.

That is, when the user issues a change instruction (e.g. operates the remote controller 21) while the electronic apparatus (TV) 1 is in a standby state, display of output information on the information display module 60 is changed.

FIG. 6C shows a state where, for example, the user operates the power button 21a of the remote controller 21 to issue an instruction (to transmit a remote control signal) to start up the electronic apparatus (TV) 1 when display of output information is changed to "volume 15", for example, as shown in FIG. 6B.

For example, the user confirms the indication of "volume 15" displayed on the information display module 60 and operates the power button 21a of the remote controller 21. As described above, for example, the remote controller 21 has the information display controller 50 as shown in FIG. 3.

Upon reception of the user's operation to start up the electronic apparatus (TV) 1 on this occasion, the remote controller 21 issues an instruction (to transmit a remote control signal) to start up the electronic apparatus (TV) 1.

For example, upon reception of this instruction, the CPU 12 of the electronic apparatus (TV) 1 issues an instruction to start up the electronic apparatus (TV) 1. Here, the CPU 12 of the electronic apparatus (TV) 1 acquires output information ("volume 15") stored in the flash memory 55 of the remote controller 21 in accordance with the start-up instruction.

That is, here, information displayed on the information display module (LED) 60 (information changed to "volume 15" as described above) is extracted from the flash memory 55 and acquired, for example, by the CPU 12 of the controller 11 of the electronic apparatus (TV) 1.

The CPU 12 of the electronic apparatus (TV) 1 instructs the speaker 9 to output audio at "volume 15", so that audio at "volume 15" is outputted from the speaker 9 of the electronic apparatus (TV) 1 in cooperation with starting-up of the electronic apparatus (TV) 1.

In this manner, for example, the user can operate the remote controller 21 as described above to control output information of the electronic apparatus (TV) 1 (e.g. volume of audio outputted from the electronic apparatus (TV) 1) before the electronic apparatus (TV) 1 is started up.

Figure 7A:
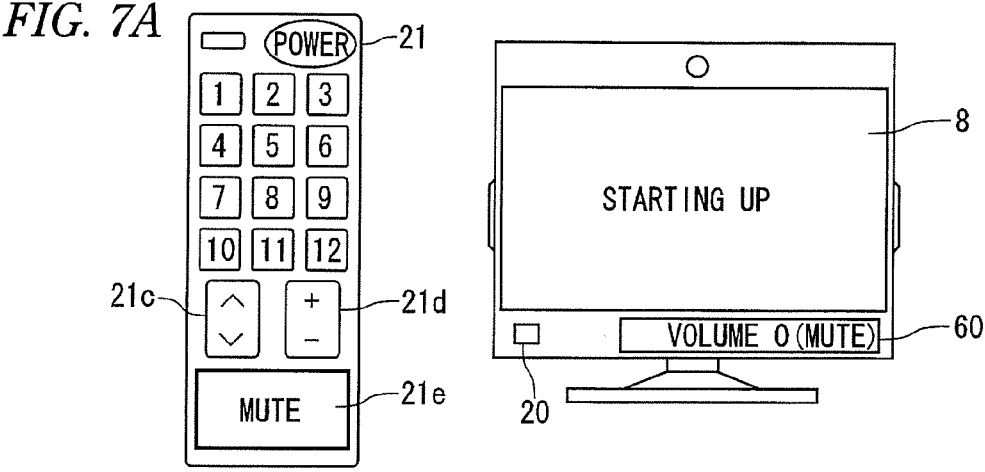
FIGS. 7A to 7C are exemplary views for explaining another example of operation concerned with volume display of the electronic apparatus (a TV etc.) according to the exemplary embodiment.
Figure 7B:
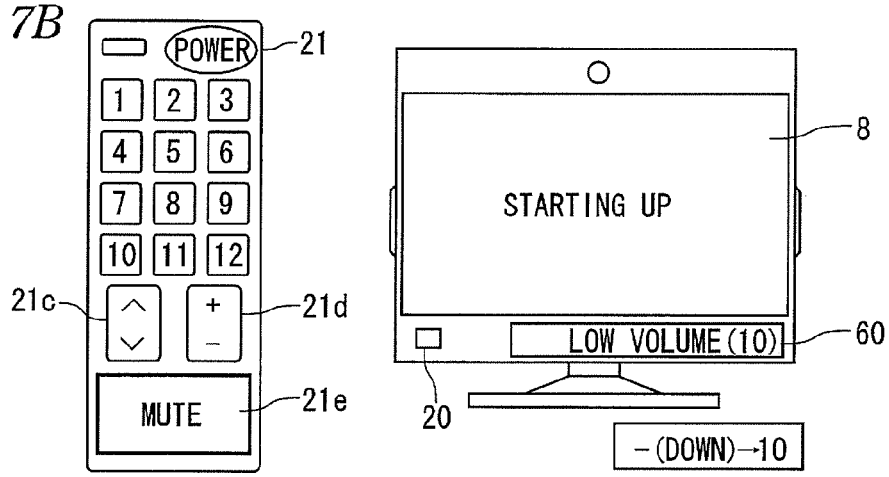
Figure 7C:
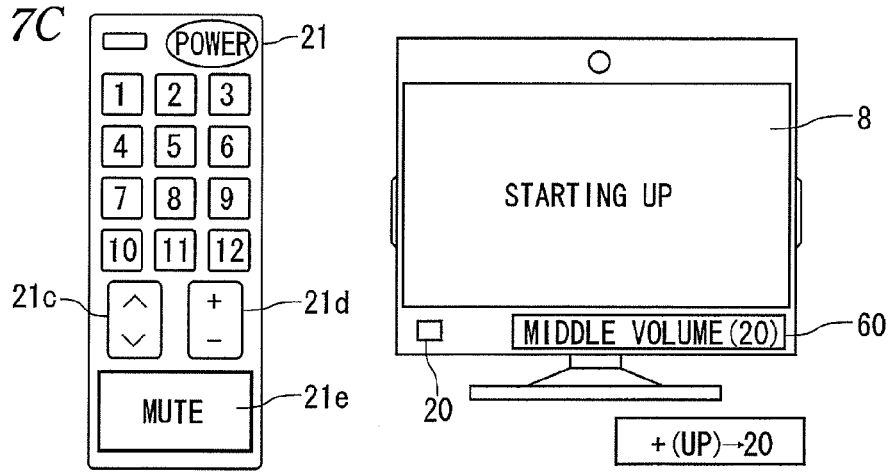

FIGS. 7A to 7C are views for explaining another example of operation concerned with volume display of the electronic apparatus (a TV etc.) according to the exemplary embodiment.

The operation described herein is made (in a standby state) before starting-up of the electronic apparatus (TV) 1, for example, as shown in FIG. 4A. The operation is started by a next operation on the remote controller 21 in the condition that the last output information (audio) set in the information display module 60 is displayed.

FIG. 7A shows a state where the user operates the volume mute key 21e of the remote controller 21 when the electronic apparatus (TV) 1 is in a state before start-up (a standby state).

Here, when the volume mute key 21e is operated while the electronic apparatus (TV) 1 is in a state before start-up (a standby state), the CPU 54 of the information display controller 50 of the electronic apparatus (TV) 1 issues an instruction to change indication displayed on the information display module 60, for example, from "volume 30" to "volume 0 (mute)".

In this manner, indication displayed on the information display module 60 is change to "volume 0 (mute)".

That is, when the volume mute key 21e is operated while the electronic apparatus (TV) 1 is in a state before start-up (a standby state), indication displayed on the information display module 60 is changed to "volume 0 (mute)".

When, for example, an instruction to start up (power ON) the electronic apparatus (TV) 1 is given while the indication "volume 0 (mute)" is displayed, the electronic apparatus (TV) 1 outputs audio at "volume 0 (mute)" when the electronic apparatus (TV) 1 is started up (powered ON).

FIG. 7B shows a state where the user operates the volume key (Down) 21d of the remote controller 21 while the electronic apparatus (TV) 1 is in a state before start-up (a standby state).

For example, the volume key 21d can be subjected to "−(Down)" operation to reduce volume.

In this exemplary embodiment, information is preset, for example, in the flash memory 55 of the information display controller 50 so that volume indication displayed on the information display module 60 is changed, for example, to "10" when the volume key 21d is subjected to the "—(Down)" operation.

Here, when the volume key 21d is subjected to the "−(Down)" operation while the electronic apparatus (TV) 1 is in a state before start-up (a standby state), there is given an instruction to change indication displayed on the information display module 60 of the electronic apparatus (TV) 1, for example, to "low volume (10)".

In this manner, indication displayed on the information display module 60 is changed to "low volume (10)".

That is, here, when the volume key 21d is subjected to the "−(Down)" operation while the electronic apparatus (TV) 1 is in a state before start-up (a standby state), indication displayed on the information display module 60 is changed to "low volume (10)".

When, for example, there is given an instruction to start up (power ON) the electronic apparatus (TV) 1 while the indication "low volume (10)" is displayed, the electronic apparatus (TV) 1 outputs audio at "low volume (10)" when the electronic apparatus (TV) 1 is started up (powered ON).

FIG. 7C shows a state where the user operates the volume key (Up) 21d of the remote controller 21 while the electronic apparatus (TV) 1 is in a state before start-up (a standby state).

For example, the volume key 21d can be subjected to "+(Up)" operation to increase volume.

In this exemplary embodiment, information is preset, for example, in the flash memory 55 of the information display controller 50 so that volume indication displayed on the information display module 60 is changed, for example, to "20" when the volume key 21d is subjected to the "+(Up)" operation.

Here, when the volume key 21d is subjected to the "+(Up)" operation while the electronic apparatus (TV) 1 is in a state before start-up (a standby state), there is given an instruction to change indication displayed on the information display module 60 of the electronic apparatus (TV) 1, for example, to "middle volume (20)".

In this manner, indication displayed on the information display module 60 is changed to "middle volume (20)".

That is, here, when the volume key 21d is subjected to the "+(Up)" operation while the electronic apparatus (TV) 1 is in a state before start-up (a standby state), indication displayed on the information display module 60 is changed to "middle volume (20)".

When, for example, there is given an instruction to start up (power ON) the electronic apparatus (TV) 1 while the indication "middle volume (20)" is displayed, the electronic apparatus (TV) 1 outputs audio at "middle volume (20)" when the electronic apparatus (TV) 1 is started up (powered ON).

FIG. 8 is a flow chart for explaining operation of the information display controller of the electronic apparatus (a TV etc.) according to the exemplary embodiment.

Step S100 is a start step on this occasion. Successively, the flow of processing goes to step S101.

Step S101 is a step in which the electronic apparatus (TV) 1 displays audio information (volume) outputted at start-up (powering-ON) time of the electronic apparatus (TV) 1 on the information display module 60. Successively, the flow of processing goes to step S102.

Step S102 is a step in which a remote control signal is outputted, for example, because the user operates the volume button 21*d* of the remote controller 21. Successively, the flow of processing goes to step S103.

Step S103 is a step in which, for example, the information display controller 50 of the electronic apparatus (TV) 1 receives the remote control signal of volume control outputted from the remote controller 21. Successively, the flow of processing goes to step S104.

Step S104 is a step in which determination is made as to whether the electronic apparatus (TV) 1 is in a state before start-up (a standby state) or not. Successively, the flow of processing goes to step S105.

Step S105 is a step in which, for example, the CPU 54 of the information display controller 50 determines whether the electronic apparatus (TV) 1 is in a state before start-up (a standby state) or not. When determination is made that the electronic apparatus (TV) 1 is in a state before start-up (a standby state), the flow of processing goes to step S106 (Yes). When determination is made that the electronic apparatus (TV) 1 is not in a state before start-up (a standby state), the flow of processing goes to step S113 (No).

Step 106 is a step in which the information display controller 50 changes volume indication displayed on the information display module 60 as described above in accordance with the received remote control signal of volume control. Successively, the flow of processing goes to step S107.

Step S107 is a step in which reception of a next remote control signal of volume control is detected. Successively, the flow of processing goes to step S108.

Step S108 is a step in which, for example, the CPU 54 of the information display controller 50 determines whether the next remote control signal of volume control is received or not. When determination is made that the remote control signal is not received, the flow of processing goes to step S109. When determination is made that the remote control signal is received, the flow of processing goes to step S103 so that the aforementioned processing is repeated.

Step S109 is a step in which, for example, the CPU 54 of the information display controller 50 counts time if the remote control signal is not received. Successively, the flow of processing goes to step S110.

Step S110 is a step in which the CPU 54 of the information display controller 50 determines whether a certain time, e.g. 5 minutes, has passed or not. For example, the certain time is stored in the flash memory 55. When determination is made that the certain time has passed, processing goes to step S111 (Yes). When determination is made that the certain time has not passed, processing of step S110 is repeated (No).

Step S111 is a step in which the last output information (volume data) displayed on the information display module 60 is stored in the flash memory 55 because the certain time has passed as described above. Successively, the flow of processing goes to step S112.

Step S112 is a step in which the last output information (volume data) displayed on the information display module 60 is displayed continuously as it is. Successively, the flow of processing goes to step S116.

Step S113 is a step in which the CPU 54 of the information display controller 50 determines whether the electronic apparatus (TV) 1 is powered ON or not. Successively, the flow of processing goes to step S114.

Step S114 is a step in which determination is made as to whether the electronic apparatus (TV) 1 is powered ON or not. When determination is made that the electronic apparatus (TV) 1 is powered ON, the flow of processing goes to step S115 (Yes). When determination is made that the electronic apparatus (TV) 1 is not powered ON, the flow of processing goes to step S102 so that the aforementioned processing is repeated (No).

Step S115 is a step in which operation of program display or the like is performed. Successively, the flow of processing goes to step S116.

Step S116 is an end step in which the processing is terminated.

Figure 9:
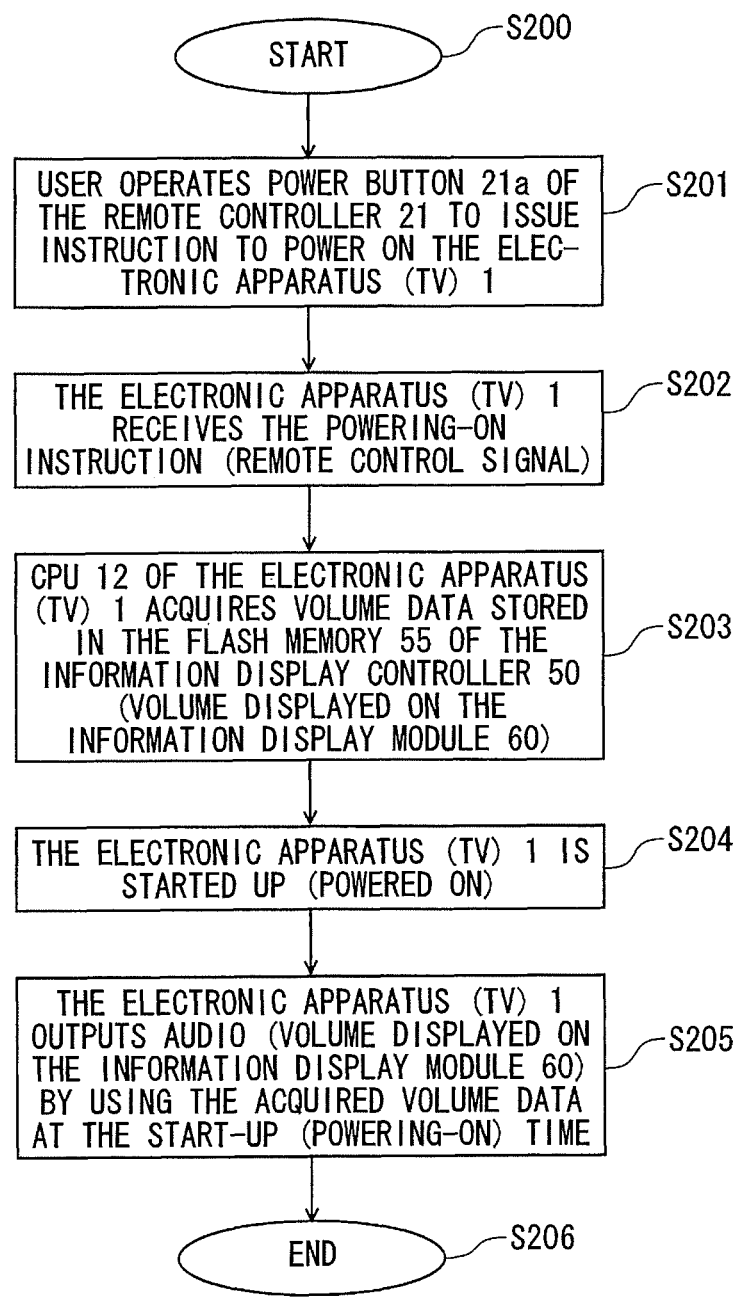
FIG. 9 is an exemplary flow chart for explaining operation of the electronic apparatus (TV) according to the exemplary embodiment.

FIG. 9 is a flow chart for explaining operation of the electronic apparatus (TV) 1 according to the exemplary embodiment.

Here, as described above, output information of volume, etc. is displayed on the information display module 60 of the electronic apparatus (TV) 1. For example, this information is stored in the flash memory 55.

For example, indication of the output information is the last (latest) information suitably changed by a user's operation or the like on the remote controller 21 as described above.

Step S200 is a start step on this occasion. Successively, the flow of processing goes to step S201.

Step S201 is a step in which, for example, the user operates the power button 21*a* of the remote controller 21 to issue an instruction to power ON the electronic apparatus (TV) 1. Successively, the flow of processing goes to step S202.

Step S202 is a step in which the electronic apparatus (TV) 1 receives the powering-ON instruction (remote control signal) outputted from the remote controller 21. Successively, the flow of processing goes to step S203.

Step S203 is a step in which, for example, the CPU 12 of the electronic apparatus (TV) 1 acquires volume data stored in the flash memory 55 of the information display controller 50. For example, the volume data is volume displayed on the information display module 60. Successively, the flow of processing goes to step S204.

Step S204 is a step in which the electronic apparatus (TV) 1 is started up (powered ON) in response to the powering-ON instruction (remote control signal). Successively, the flow of processing goes to step S205.

Step S205 is a step in which, for example, the volume data acquired from the flash memory 55 is used for outputting audio in accordance with the volume data when the electronic apparatus (TV) 1 is started up (powered ON). For example, the volume data is volume displayed on the information display module 60. Successively, the flow of processing goes to step S206.

Step S206 is an end step in which the processing is terminated.

Figure 10A:
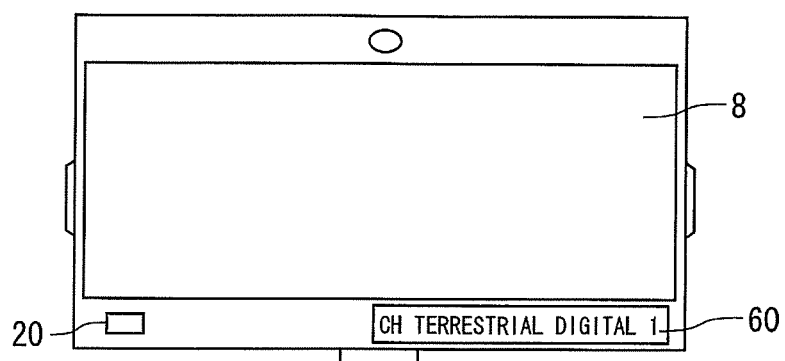
FIGS. 10A to 10C are exemplary views for explaining another example of operation concerned with channel display in the electronic apparatus (a TV etc.) according to the exemplary embodiment.
Figure 10B:
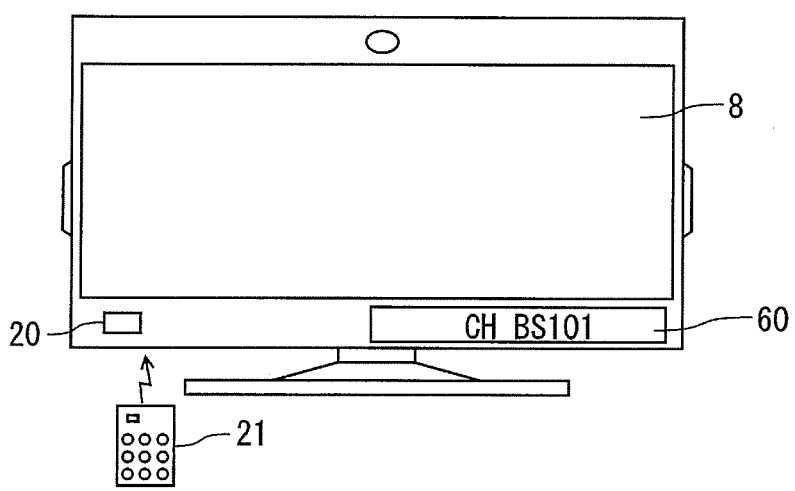
Figure 10C:
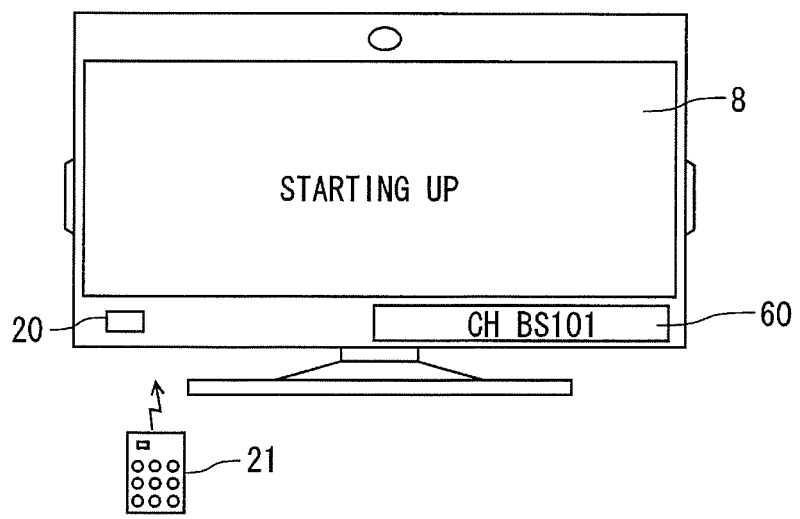

FIGS. 10A to 10C are views for explaining another example of operation concerned with channel display in the electronic apparatus (a TV etc.) according to the exemplary embodiment.

Here, broadcast channel information is used as an example of output information displayed on the information display module 60.

Here, the broadcast channel information is, for example, the last broadcast channel information outputted and displayed or broadcast channel information changed based on the change instruction outputted from the remote controller 21 operated by the user when, for example, the electronic apparatus (TV) 1 is in a standby state.

FIG. 10A shows a state where the electronic apparatus (TV) 1 is in a (standby) state before start-up.

As shown in FIG. 10A, output information (broadcast channel information) is outputted and displayed on the information display module 60. Here, the output information (broadcast channel information) is, for example, displayed as "Ch Terrestrial Digital 1".

FIG. 10B shows a state where Ch display in the output information (broadcast channel information) displayed on the information display module 60 is changed, for example, because the electronic apparatus (TV) 1 in a (standby) state before start-up receives a remote control signal outputted from the remote controller 21.

As shown in FIG. 10B, for example, "Ch BS101" is displayed on the information display module 60.

FIG. 10C shows a state where, for example, a start-up (power-ON) signal is outputted from the remote controller 21 in the condition that the output information (broadcast channel information) is displayed on the information display module 60, so that the electronic apparatus (TV) 1 receiving the signal is started up (powered ON).

Here, for example, "Ch BS101" is displayed on the information display module 60. When the electronic apparatus (TV) 1 is started up (powered ON), "Ch BS101" is received so that the broadcast is outputted and displayed on the video display module (display screen) 8.

Figure 11:
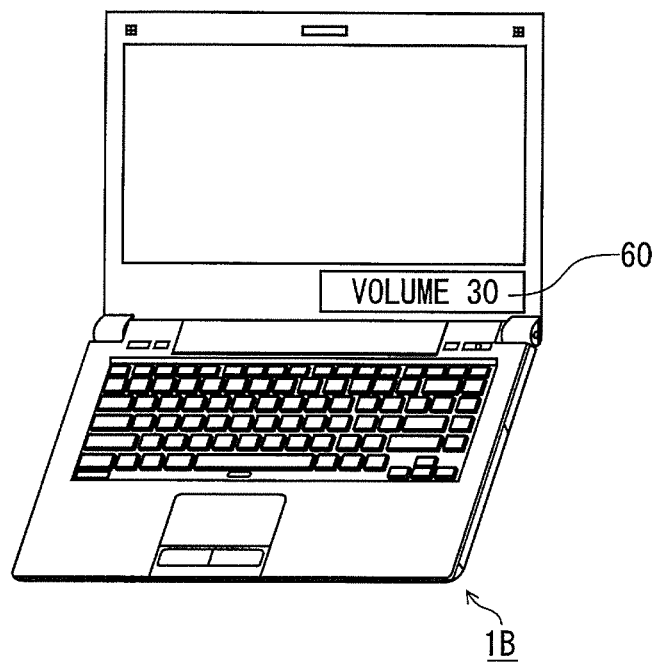
FIG. 11 is an exemplary external view showing the external appearance of an electronic apparatus (personal computer) according to the exemplary embodiment.

FIG. 11 is an external view showing the external appearance of an electronic apparatus (personal computer) according to the exemplary embodiment.

In this exemplary embodiment, the electronic apparatus (personal computer, PC) 1B is provided with an information display module 60 in the same manner as described above.

Like the electronic apparatus (TV) 1, the electronic apparatus (personal computer, PC) 1B outputs and displays output information at start-up time of the electronic apparatus on the information display module 60.

The electronic apparatus (personal computer, PC) 1B also includes the information display controller 50 as shown in FIG. 3, so that an instruction to change output information outputted and displayed on the information display module 60 can be received. Here, for example, the user operates a keyboard or the like of the electronic apparatus (PC) 1B to issue an instruction to change output information outputted and displayed on the information display module 60. Alternatively, a remote controller, etc. not shown here may be provided to issue an instruction to change output information.

When the change instruction is received in the condition that the electronic apparatus (personal computer, PC) 1B is in a standby state, control is performed to change display of the output information in accordance with the change instruction in the same manner as described above.

Although description has been made above in the case where a TV or a PC is used as an example of the electronic apparatus, this exemplary embodiment is not limited thereto. For example, this exemplary embodiment may be applied to an electronic apparatus such as a smart phone or a portable terminal.

In this exemplary embodiment, it is preferable that output information at start-up time of the electronic apparatus is displayed at least before the electronic apparatus is started up.

It is preferable that changed output information is displayed on the information display module 60 until a next change instruction is received.

When the video display module (display screen) 8 and the information display module 60 are arranged side by side, user's visual recognition is improved.

It is preferable that the information display controller 50 is, for example, connected to a rechargeable battery.

The electronic apparatus may be formed so that indication showing audio muting is displayed when an instruction to mute audio is received.

The electronic apparatus may be configured so that preset volume information is displayed, for example, on the information display module 60 when an instruction to increase or decrease volume of audio to be outputted is received.

With the aforementioned configuration, in this exemplary embodiment, output information of the electronic apparatus (TV) 1 (e.g. volume of audio outputted from the electronic apparatus (TV) 1) can be adjusted, for example, before the electronic apparatus (TV) 1 is started up.

In this manner, volume at start-up (powering-ON) of the electronic apparatus (a TV etc.) can be adjusted.

Incidentally, the aforementioned exemplary embodiment is not limited to the description per se and constituent members may be changed variously to embody the invention without departing from the gist of the invention in a practical stage.

While certain embodiments have been described, these embodiments have been presented by way of example only, and are not intended to limit the scope of the invention. Indeed, the novel apparatus and method described herein may be embodied in a variety of other forms; furthermore, various omissions, substitutions and changes in the form of the apparatus and method, described herein may be made without departing from the sprit of the invention. The accompanying claims and their equivalents are intended to cover such forms or modifications as would fall within the scope and sprit of the invention.

What is claimed is:

1. An electronic apparatus comprising:
an information display module configured to display output information of at least one of (i) a volume level at which audio should be output when the electronic apparatus is started up and (ii) a broadcast channel of which video should be output when the electronic apparatus is started up;
a change instruction receiver configured to receive a change instruction to change the at least one of (i) the volume level at which the audio is to be output when the electronic apparatus is started up and (ii) the broadcast channel of which the video is to be output when the electronic apparatus is started up; and
an information display controller configured to control the information display module to display the output information which is changed in accordance with the change instruction when the change instruction receiver receives the change instruction before the electronic apparatus is started up, wherein
when the electronic apparatus is started up after the change instruction receiver receives the change instruction before the electronic apparatus is started up, it is executed at least one of (a) to output the sound at the volume level which is changed in accordance with the change instruction received by the change instruction receiver and (b) to output the video in the broadcast channel which is changed in accordance with the change instruction received by the change instruction receiver.

2. The apparatus of claim 1, wherein the information display controller is configured to control the information display module to display the output information at least before the electronic apparatus is started up.

3. The apparatus of claim 1, wherein the information display controller is configured to control the information display module to display the output information which has been changed in accordance with the change instruction until the change instruction receiver receives a second change.

4. The apparatus of claim 1, further comprising:
a storage module configured to store the changed output information.

5. The apparatus of claim 1, wherein:
the change instruction is a remote control signal.

6. The apparatus of claim 3, wherein the storage module stores the changed output information when the change instruction receiver has not received the second change instruction for a certain time.

7. The apparatus of claim 1, further comprising:
a video display module configured to display the video and disposed side by side with the information display module.

8. The apparatus of claim 1, wherein:
the information display controller is connected to a battery.

9. The apparatus of claim 1, wherein:
the information display controller is connected to a rechargeable battery.

10. The apparatus of claim 4, wherein: the information display controller is connected to the storage module.

11. The apparatus of claim 1, wherein the information display controller is configured to control the information display module to display indication showing muting the audio when the change instruction receiver receives an instruction to mute the audio.

12. The apparatus of claim 1, wherein when the change instruction receiver receives an instruction to increase/decrease a volume level of the audio, the information display controller controls the information display module to display a volume level which is increased/decreased in accordance with the instruction.

13. An electronic apparatus control device comprising:
an information display module configured to display output information of at least one of (i) a volume level at which audio is to be output when the electronic apparatus is started up and (ii) a broadcast channel of which video is to be output when the electronic apparatus is started up;
a change instruction receiver configured to receive a change instruction to change the at least one of (i) the volume level at which the audio is to be output when the electronic apparatus is started up and (ii) the broadcast channel of which the video is to be output when the electronic apparatus is started up;
an information display controller configured to control the information display module to display the output information which is changed in accordance with the change instruction when the change instruction receiver receives the change instruction before the electronic apparatus is started up; and
a start-up instruction module configured to instruct the electronic apparatus to start up, wherein when the electronic apparatus is started up after the change instruction receiver receives the change instruction before the electronic apparatus is started up, it is executed at least one of (a) to output the sound at the volume level which is changed in accordance with the change instruction received by the change instruction receiver and (b) to output the video in the broadcast channel which is changed in accordance with the change instruction received by the change instruction receiver.

14. An electronic apparatus control method comprising:
displaying output information of at least one of (i) a volume level at which audio is to be output when an electronic apparatus is started up and (ii) a broadcast channel of which video is to be output when the electronic apparatus is started up;
receiving a change instruction to display the at least one of (i) the volume level at which the audio is to be output when the electronic apparatus is started up and (ii) the broadcast channel of which the video is to be output when the electronic apparatus is started up;
performing control to display the output information which is changed in accordance with the change instruction when the change instruction is received before the electronic apparatus is started up; and
when the electronic apparatus is started up after the change instruction receiver receives the change instruction before the electronic apparatus is started up, executing at least one of (a) to output the sound at the volume level which is changed in accordance with the received change instruction and (b) to output the video in the broadcast channel which is changed in accordance with the received change instruction.

* * * * *